Patented Nov. 4, 1952

2,616,927

UNITED STATES PATENT OFFICE 2,616,927

FLUOROCARBON TERTIARY AMINES

Edward A. Kauck, St. Paul, Minn., and Joseph H. Simons, State College, Pa., assignors to Minnesota Mining & Manufacturing Company, St. Paul, Minn., a corporation of Delaware No Drawing. Application May 12, 1950, Serial No. 161,717

10 Claims. (Cl. 260—563)

This application is a continuation-in-part of our copending application Ser. No. 29,955, filed on May 28, 1948 (now abandoned).

This invention relates to our discovery of a new and useful class of fluorinated carbon compounds, namely, the saturated fluorocarbon tertiary amines. In these novel compounds the molecules contain only carbon, fluorine and nitrogen atoms and each nitrogen atom is directly bonded to three carbon atoms.

These compounds constitute the family of fully fluorinated analogues of the family of saturated hydrocarbon tertiary amines, the carbon-nitrogen skeletal structures being the same but all hydrogen atoms being replaced by fluorine atoms. These compounds are termed fluorocarbon "amines" merely as a matter of expediency in order to conform with commonly used nomenclature practice. The tertiary amines of conventional organic chemistry are regarded as derived from ammonia, $NH_3$, by replacement of the three hydrogen atoms by three hydrocarbon radicals. The present compounds may be correspondingly regarded as derived from nitrogen trifluoride, $NF_3$, by replacement of the three fluorine atoms by three fluorocarbon radicals. The present compounds have physical and chemical properties which are entirely different from those of the corresponding hydrocarbon tertiary amines, as will be indicated in more detail hereafter. They are members of a disparate class of tertiary "amine" compounds which is sui generis.

The present family of compounds embraces cyclic as well as non-cyclic compounds, and polyamines as well as monoamines, all of which have their structural analogues in the hydrocarbon system of tertiary amines. It is our discovery that the electrochemical process which we employ is a general process capable of producing the fully fluorinated analogues of all of the saturated hydrocarbon tertiary amines, as distinguished from special processes capable of preparing particular species or types of compounds only.

We have found that the compounds of the present class can be directly made from the corresponding hydrocarbon amine compounds as starting materials by employing the novel electrochemical process broadly described and claimed in the copending application of one of us, J. H. Simons, Ser. No. 62,496, filed November 29, 1948 (which replaced Ser. No. 677,407, filed June 17, 1946, and since abandoned), now Patent No. 2,519,983, issued on August 22, 1950. This process involves electrolyzing a solution of liquid hydrogen fluoride containing the organic starting material, and is described in more detail hereafter.

Those compounds which contain five or more carbon atoms in the molecule have boiling points above room temperature and hence are normally non-gaseous. Compounds containing eight or more carbon atoms have boiling points near to or above that of water and may be referred to as high-boiling compounds.

These fluorocarbon tertiary amine compounds are water-insoluble; they have a high degree of chemical inertness; they are non-flammable; and they can be heated to moderately elevated temperatures in "Pyrex" laboratory type glassware without reacting or decomposing. They do not react with metallic sodium or potassium at room temperatures. Making comparisons with non-fluorine compounds on the basis of molecular weights, these new compounds have exceptionally low boiling points, low refractive indices, low viscosities and low surface tensions. They are colorless and are apparently odorless when in pure form.

These compounds have properties which permit of use for many of the purposes for which saturated fluorocarbons can be used. They can be employed as refrigerants, inert diluents for chemical reactions, solvents, hydraulic mechanism fluids, heat transfer media, turbine impellants, transformer liquids, dielectrics, and lubricants. They can also be used as intermediates in the manufacture of other compounds.

Various illustrative sub-classes of our novel compounds will now be indicated and exemplary compounds will be mentioned, following which a number of experimental examples will be set forth to illustrate the general utility of the process and to provide detailed data on various of the compounds.

The saturated aliphatic trifluorocarbon monoamines (containing a single nitrogen atom) are derivable from the corresponding trialkyl amines, and have the same structure except that the hydrogen atoms have been entirely replaced by fluorine atoms. The nitrogen atom of the molecule is directly bonded to each of three saturated aliphatic fluorocarbon groups. These compounds have the formula:

$$R'R''R'''N$$

where the R's represent saturated aliphatic fluorocarbon groups which may be the same or different, having the generic formula: $-C_nF_{2n+1}$. A fluorocarbon group which contains three or more carbon atoms may be present either as a "normal" (straight chain) group or as an isomeric group having a branched structure.

The simplest illustration of these compounds is provided by tri-trifluoromethyl amine, having the structural formula:

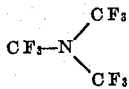

The following table shows how the boiling points of these compounds vary with the number of carbon atoms, and has been simplified by including only the normal (straight chain) compounds wherein the three fluorocarbon groups are the same. Boiling points at 760 mm. pressure are given. These listed compounds are all fluid (gaseous or liquid) at room temperature.

| Compounds: | B. P. (° C.) |
|---|---|
| $(CF_3)_3N$ | −11 |
| $(C_2F_5)_3N$ | 70 |
| $(C_3F_7)_3N$ | 130 |
| $(C_4F_9)_3N$ | 178 |
| $(C_5F_{11})_3N$ | 218 |
| $(C_6F_{13})_3N$ | 258 |
| $(C_7F_{15})_3N$ | 294 |
| $(C_8F_{17})_3N$ | 321 |

It will be noted that these boiling points are substantially lower than those of the corresponding compounds of the hydrocarbon trialkyl amine series (despite the fact that the molecular weights are much higher). Thus the B. P. of $(C_2F_5)_3N$ is 70° C. as compared with 89° C. for $(C_2H_5)_3N$. The B. P. of $(C_6F_{13})_3N$ is 258° C. as compared with 300° C. for $(C_6H_{13})_3N$.

The boiling points of these compounds are higher than those of the saturated aliphatic fluorocarbons having the same number of carbon atoms, as is illustrated by the fact that the B. P. of normal $C_6F_{14}$ is about 55° C. as compared to 70° C. for $(C_2F_5)_3N$.

Unsymmetrical as well as symmetrical compounds are included. The lack of symmetry may arise from different numbers of carbon atoms in the fluorocarbon groups, as in the case of $(CF_3)_2N(C_5F_{11})$. Another type of non-symmetry exists when the groups differ as to branching, as when one group is branched and the others are normal straight chains. Both types of non-symmetry may be present, as in the case of $(CF_3)_2N(iso—C_5F_{11})$.

Unlike the trialkyl amines, even the lowest trifluorocarbon amines are not only water-insoluble but do not react with, and are not soluble in, the mineral acids. They are not miscible with the trialkyl amines. They separate out when mixed with liquid hydrogen fluoride, although the trialkyl amines are highly soluble in the latter.

Tests made both at room temperature and at the temperature of boiling water (100° C.) indicate that these compounds do not react with any of the following: concentrated HCl, concentrated $H_2SO_4$, concentrated NaOH, 30% $H_2O_2$, $HNO_2$, and methyl iodide.

The invention is not limited to the aliphatic series of compounds. The nitrogen-bonded saturated carbon-chain groups need not be of the open-chain type; since one, two or all three may be alicyclic, containing a saturated fluorocarbon ring (closed chain). Examples of such compounds are $(C_6F_{11}CF_2)_3N$, corresponding to tri-cyclohexylmethylamine; $(C_6F_{11}CF_2CF_2)_3N$, corresponding to tricyclohexylethylamine;

$$(CF_3)_2NC_6F_{11}$$

corresponding to dimethylcyclohexylamine;

$$(C_6F_{11})_2NCF_3$$

corresponding to dicyclohexylmethylamine; and $(C_6F_{11})_3N$, corresponding to tricyclohexylamine. In these cyclohexyl compounds the molecules contain only acyclic nitrogen atoms, that is, the rings are carbocyclic and the nitrogen atoms are not present in the rings. The nitrogen atom can be in a ring (which may be regarded as formed by the closure of two nitrogen-bonded fluorocarbon chains), as illustrated by the heterocyclic fluorinated N-alkylpiperidines, such as $C_5F_{10}NCF_3$, corresponding to N-methylpiperidine, and $$C_5F_{10}NC_2F_5$$

corresponding to N-ethylpiperidine, etc., wherein $C_5F_{10}N$ is a fluoropiperidine group. A further illustration is $C_5F_{10}NC_6F_{11}$, corresponding to N-cyclohexylpiperidine. The previously mentioned electro-chemical process is adapted to the production of such cyclic compounds from the corresponding hydrocarbon amine compounds, the hydrogen atoms being replaced by fluorine atoms.

The invention embraces tertiary polyamine compounds, which contain more than one tertiary nitrogen atom. These can be made by the aforesaid electrochemical process. An example is the diamine compound:

$$(CF_3)_2N—CF_2CF_2CF_2—N(CF_3)_2$$

corresponding to N,N,N',N'-tetramethyltrimethylenediamine.

A further example is:

$$(C_2F_5)_2N—CF_2CF_2—N(C_2F_5)_2$$

corresponding to N,N,N',N'-tetraethylethylenediamine. These diamine compounds have the generic formula:

$$R'R''N—R—NR'''R''''$$

where the primed R's represent saturated terminal fluorocarbon groups and R represents a nitrogen-linking saturated fluorocarbon group.

An example of a triamine compound is:

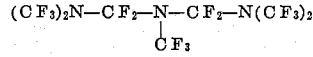

A further example is:

$$1,3,5—[(CF_3)_2NCF_2]_3C_6F_9$$

wherein $C_6F_9$ is a fluorocyclohexyl ring.

In respect to the various types of saturated fluorocarbon tertiary amine compounds claimed herein, an important category consists of compounds wherein two or all of the three nitrogen-bonded carbon atoms are constitutents of $—CF_2—$ groups. Each of these groups is also bonded either to a fluorine atom or to a carbon atom of a saturated fluorocarbon group. In the latter case the nitrogen-bonded initial carbon atom of the group is necessarily a "primary" carbon atom (only one other carbon atom being directly bonded to it). Previously mentioned examples include $(CF_3)_3N$, normal $(C_4F_9)_3N$, and $(CF_3)_2NC_6F_{11}$.

The electrochemical process produces as by-products various fragmentation products containing fewer carbon atoms than the parent compound, due to cleavage of carbon-nitrogen and even carbon-carbon bonds in the case of some molecules. Thus some $CF_4$ will be recovered from $(CH_3)_3N$, and some $CF_4$ and $C_2F_6$ from $(C_2H_5)_3N$.

Another type of by-product consists of fluorocarbon tertiary amine compounds which contain a greater number of carbon atoms and which have higher boiling points than the fluorocarbon tertiary amine which corresponds to the starting compound. These are presumably formed by the combining of free radicals in the electrolyte solution. These high-boilers range from free-flowing liquids up through viscous oily liquids, greases, tacky solids, and brittle resinous solids.

Still another type of by-product consists of amine compounds wherein less than all of the hydrogen atoms have been replaced by fluorine atoms. These have higher boiling points than the corresponding fully fluorinated amines having the same number of carbon atoms. Included in this category are high-boilers containing a greater number of carbon atoms than the starting compound, which evidently are formed by the combining of free radicals in the electrolyte solution. These hydrogen-containing high-boilers range from free-flowing liquids up to brittle solids and contain, generally, a fraction of one-percent of combined hydrogen.

The complex mixture of fluorocarbon tertiary amines (which are fully fluorinated) and the above-mentioned hydrogen-containing amines (which are partially fluorinated), as obtained from the electrochemical cell, can be fractionally distilled to obtain cuts of differing consistencies and boiling ranges, ranging from free-flowing liquids to brittle solids. For instance, the high-boilers from the treatment of triethylamine, $(C_2F_5)_3N$, yield fractions having boiling points as high as 150° C. and higher. The high-boilers from the treatment of tributylamine, $(C_3F_7)_3N$, yield fractions which have the consistency at room temperature of oils, greases, and brittle solids, with vacuum boiling points at 4 mm. pressure ranging as high as 285° C. and with the number of carbon atoms per molecule ranging as high as forty or more. These high-boiler cuts are very soluble in liquid fluorocarbons and in liquid fluorocarbon amines.

The lower-boiling compounds of the two types (fully fluorinated and incompletely fluorinated) can be separated from each other by fractional distillation. The fully fluorinated compounds can be further purified by refluxing with 25% NaOH solution for a period of several hours to eliminate any remaining hydrogen-containing contaminants. Purification can also be effected by selective adsorption of the hydrogen-containing compounds, using silica gel, activated alumina, or activated carbon. The hydrogen-containing fluoroamines can also be effectively removed from the high-boiler mixtures by selective adsorption so as to obtain high-boiler compositions consisting of substantially pure fluorocarbon tertiary amines. In this way fluorocarbon tertiary amine fractions can be obtained which contain as many as forty or more carbon atoms in the molecule and which are brittle solids at room temperature.

Although these hydrogen-containing fluoroamines have a relatively good degree of thermal stability and chemical inertness, they lack the stability and inertness characteristic of the fully fluorinated compounds. In particular, they undergo dehydrofluorination at elevated temperatures, giving off HF; they decompose when refluxed with boiling sodium hydroxide solutions; and the hydrogen atoms offer points of attack for chemical reactions. Some or all of the hydrogen atoms thereof can be replaced by chlorine or bromine atoms by the thermal chlorination and bromination process which, as applied to fluorocarbon hydrides, was described by J. H. Simons, et al., in the Journal of the American Chemical Society, vol. 68, pp. 968-969 (June, 1946). The procedure consists in passing a gaseous mixture of the starting compound, and chlorine or bromine, through a tube which is heated to a high temperature by a furnace, and separating the chlorinated or brominated reaction product from the resultant reaction mixture, as by fractional distillation.

Despite the formation of by-products, the electro-chemicals process is capable of providing good yields of the fully fluorinated tertiary amine corresponding to the hydrocarbon amine starting compound.

ELECTROCHEMICAL METHOD OF MAKING

As previously stated, the compounds of this invention can be conveniently made by electrolyzing solutions of the corresponding hydrocarbon amine compounds in liquid hydrogen fluoride, the end result of which is to replace hydrogen atoms with fluorine atoms. The formation of by-products has been discussed above. It is not essential to use a hydrocarbon amine (containing only hydrogen atoms to be replaced by fluorine atoms) as equivalent tertiary amines can be employed which contain one or more other carbon-bonded atoms or groups which are replaceable by fluorine atoms in the operation of the process. Thus an amine having one or more carbon-bonded hydroxyl groups (—OH) can be used, as illustrated by triethanolamine, in which case the hydroxyl groups as well as the carbon-bonded hydrogen atoms will be replaced by fluorine atoms. Unsaturated and aromatic amine starting compounds can be employed, which have the same carbon-nitrogen skeleton structures as the desired saturated end products, saturation resulting from fluorine addition in the operation of the process. Thus $(CF_3)_2NC_6F_{11}$ can be made from dimethylaniline, $(CH_3)_2NC_6H_5$.

When the starting compound is a mixture of isomeric species (such as a mixture of normal and branched-chain forms of the compound), a corresponding mixture of isomeric species of the fluorocarbon amine product will be obtained.

A simple type of electrolytic cell can be used, employing a nickel anode and an iron or steel cathode, for example. An iron or steel container can be used, which may be employed as a cathode, with a cover of iron or steel which is bolted in place. Anode and cathode plates, in closely-spaced alternating array, can be suspended from the cover. A suitable gasket material, and insulating material for electrode mountings and leads, is "Teflon" (polytetrafluoroethylene). An upper outlet for gaseous products, an upper inlet for charging materials, and a bottom outlet for liquid products, may be provided. The cell may be provided with a cooling jacket for maintaining a desired operating temperature.

Commercial anhydrous liquid hydrogen fluoride can be used. This normally contains a trace of water, but water need not be present and highly anhydrous hydrogen fluoride can be used. Additional water can be present, but more than a few percent will seriously reduce the operating efficiency. The amine starting compounds are soluble in this material.

A cell potential of about 4 to 8 volts D. C. has been found suitable. A current density of about 20 amperes per square foot of anode surface can be obtained. Voltages sufficiently high to result in the formation of free fluorine are avoided. The process does not depend upon the generation of free fluorine and the latter, if produced, would result in explosions, electrode corrosion, and undesirable reactions.

The preferred operating pressure is atmospheric pressure or a moderately elevated pressure, and the preferred operating temperature range is about 0 to 20° C.; but higher and lower operating pressures and temperatures can be employed.

When $(CF_3)_3N$ or other gaseous amine product is being made, it can be withdrawn with and separated from the other gaseous products of the cell. Liquid amine product compounds separate as a constituent of a liquid which is immiscible with the electrolyte and settles to the bottom of the cell from which it can be withdrawn. The latter can be washed with a base and with dilute sulfuric acid, and fractionally distilled to yield the desired fully fluorinated amine product. The desired fully fluorinated amine product can be further purified by refluxing with 25% NaOH solution for a period of several hours. This effectively eliminates any hydrogen-containing by-product contaminants. Higher product compounds are also formed and can be recovered and purified as previously mentioned.

*Example 1*

175 grams of trimethylamine was dissolved in 1800 grams of commercial anhydrous liquid hydrogen fluoride and electrolyzed in an iron laboratory cell containing nickel electrodes. The mixture of gaseous products of the cell was led through a low-temperature condenser (−40° C.) to condense out most of the HF present in the mixture (which was returned to the cell), then through an aqueous calcium chloride bubbler to remove remaining traces of HF, then through an aqueous potassium-sulfite-iodide bubbler to remove traces of $OF_2$, then through an aqueous potassium hydroxide bubbler to remove traces of $CO_2$, then through a dry potassium hydroxide tower to remove traces of water, and then through a liquid air trap to separate the hydrogen from the therein condensed compounds. The traces of $CO_2$ and $OF_2$ result when there is a trace of water in the electrolyte of the cell. At the end of 19 hours, 400 grams of material had been condensed in the liquid air trap and this was subjected to fractional distillation. In addition to normally gaseous fractions identified as $CF_4$, $CF_3H$ and $NF_3$, there was obtained a normally gaseous fraction identified as relatively pure $(CF_3)_3N$, tri-trifluoromethylamine, having the following properties:

Boiling point (at 735 mm.) _____ minus 11° C.
Molecular weight (found) _____ 224
Molecular weight (calc.) _____ 221

The identification was additionally confirmed by the infra-red absorption spectrum.

*Example 2*

175 grams of triethylamine was dissolved in 1800 grams of commercial anhydrous liquid hydrogen fluoride and the solution was placed in an iron laboratory cell containing nickel anodes. The applied potential was 5.6 volts D. C., which resulted in a current flow of 20 amperes per square foot of anode surface, operating at atmospheric pressure and a temperature of 0° C. At the end of 25 hours an immiscible liquid, weighing 172 grams, was withdrawn from the bottom of the cell. This was washed with base (potassium hydroxide solution) and with sulfuric acid and was fractionally distilled to yield a liquid main fraction which was identified as relatively pure $(C_2F_5)_3N$, tri-pentafluoroethylamine.

That this compound was not a fluorocarbon, was made apparent from the differences in physical properties relative to the boiling point value. In fact the only fluorocarbon of comparable boiling point that might be expected to have been formed from the particular amine starting compound is $C_6F_{14}$, having a molecular weight of 338 and having a boiling point of about 55° C. for the normal form. These values differ from those determined for the found compound by many times the probable experimental error. In addition, analytical determinations were made for fluorine and nitrogen which checked with the calculated values for $(C_2F_5)_3N$ to within a close experimental margin of error, and still further confirmation was provided by the infra-red absorption spectrum.

The measured properties of this $(C_2F_5)_3N$ fraction were as follows:

Boiling point (at 743 mm.) _____° C__ 68–69
Refractive index (at 25° C.) _____ 1.258
Density (grams/cc. at 35° C.) _____ 1.708
Dielectric constant (at 20° C.) _____ 1.86
Molecular weight (from vapor density) __ 370
Per cent nitrogen _____ 3.93
Per cent fluorine _____ 76.0

The calculated values for pure $(C_2F_5)_3N$ are: molecular weight 371, per cent nitrogen 3.77, per cent fluorine 76.7.

In another experiment employing triethylamine as the starting compound, distillation of the cell drainings resulted in the obtaining of a main fraction of distillation bottoms which was fractionally redistilled to yield the following cuts all of which showed the presence of combined hydrogen upon analysis:

| Cut No. | Weight (grams) | B. P. (° C.) | Percent H | N. W. | $n_D^{25}$ | Density |
|---|---|---|---|---|---|---|
| 1 | 200 | 71–75 | 0.24 | 347 | 1.267 | 1.689 |
| 2 | 25 | 75–82 | 0.42 | 339 | 1.272 | 1.656 |
| 3 | 40 | 82–88 | 0.418 | 364 | 1.277 | 1.680 |
| 4 | 221 | 88–153 | | | | |
| 5 | 545 | Residue | 0.16 | | 1.311 | 1.706 |

Cuts 2 and 3 were identified as mixtures of partially fluorinated triethylamines containing an average of about one to two atoms of hydrogen per molecule.

In another similar experiment also using triethylamine as the starting compound, fractionation of the liquid product resulted in obtaining a recognized fraction of $(C_2F_5)_2CF_3N$, di-pentafluoroethyl-trifluoromethylamine, having the following properties:

Boiling point (at 734 mm.) _____° C__ 45
Refractive index (at 25° C.) _____ 1.253
Molecular weight (found) _____ 320
Molecular weight (calc.) _____ 321

This illustrates that some molecular fragmentation takes place to produce trifluorocarbon amine end products having fewer carbon atoms than the starting compound.

Example 3

Using tri-n-propylamine as the starting compound in the electrochemical process there was obtained a liquid fraction which was identified as relatively pure normal $(C_3F_7)_3N$, tri-n-heptafluoropropylamine, which was found to have the following properties:

| | |
|---|---|
| Boiling point (at 760 mm.) °C | 130 |
| Refractive index (at 25° C.) | 1.279 |
| Density (grams/cc. at 25° C.) | 1.821 |

Example 4

150 grams of tri-n-butylamine was dissolved in 1800 grams of commercial anhydrous liquid hydrogen fluoride and electrolyzed in the manner previously indicated. An additional 285 grams of the amine was added during the run. At the end of 74 hours, 832 grams of immiscible liquid was removed from the bottom of the cell and was washed and fractionated to yield a liquid main fraction which was identified as relatively pure normal $(C_4F_9)_3N$, tri-n-nonafluorobutylamine. This fraction had the following properties:

| | |
|---|---|
| Boiling point (at 755.8 mm.) °C | 177.2 |
| Refractive index (at 25° C.) | 1.290 |
| Density (grams/cc. at 23° C.) | 1.856 |
| Dielectric constant (at 20° C.) | 2.15 |
| Molecular weight | 670 |
| Per cent nitrogen | 2.0 |
| Per cent fluorine | 74.8 |

The calculated values for pure $(C_4F_9)_3N$ are: molecular weight 671, per cent nitrogen 2.09, per cent fluorine 76.5.

In another experiment employing tri-n-butylamine as the starting material, the primary distillation bottoms were fractionated under vacuum to give the following cuts:

| Cut No. | Weight (grams) | B. P. (°C.) | B. P. (mm.) | Percent H | $n_D^{25}$ | Appearance at Room Temperature |
|---|---|---|---|---|---|---|
| 1 | 98 | 65–85 | 2 | 0.07 | 1.308 | Clear oily liquid. |
| 2 | 89 | 88–95 | 2 | 0.08 | 1.310 | Do. |
| 3 | 83 | 96–106 | 2 | 0.09 | 1.312 | Do. |
| 4 | 92 | 109–128 | 2 | 0.11 | 1.315 | Light oil. |
| 5 | 113 | 130–143 | 2 | 0.14 | 1.319 | Medium oil. |
| 6 | 109 | 146–152 | 2 | 0.17 | 1.321 | Heavy oil. |
| 7 | 89 | 154–164 | 2 | 0.18 | 1.322 | Very heavy oil. |
| 8 | 29 | 169 | 2 | 0.19 | 1.325 | Light grease. |
| 9 | 60 | 191–220 | 3 | 0.22 | 1.329 | Grease. |
| 10 | 58 | 220–250 | 4 | | 1.331 | Very heavy grease. |
| 11 | 6 | 240–285 | 4 | 0.23 | 1.35 | Brown brittle solid. |
| 12 | 3 | 285 | 4 | 0.25 | 1.35 | Do. |

Cut 12 was estimated to contain an average of forty carbon atoms per molecule. Cuts 5, 6 and 9, were subsequently refluxed with 25% aqueous sodium hydroxide for four hours, washed, and redistilled; and the cuts as thus treated were found to have the per cent H values reduced to 0.10, 0.10, and 0.14%, respectively. These high-boiler fractions contained mixtures of fully fluorinated and incompletely fluorinated tertiary amines. As previously mentioned, the hydrogen-containing compounds can be removed by selective adsorption methods.

Example 5

150 grams of triamylamine was dissolved in 1800 grams of commercial anhydrous liquid hydrogen fluoride and electrolyzed in a similar manner. The starting compound was a commercial product consisting of a mixture of normal and branched chain isomeric species of triamyl amine, having different boiling points. At the end of 94 hours, 392 grams of immiscible liquid was removed from the bottom of the cell and washed and fractionated to yield a liquid main fraction which was identified as relatively pure $(C_5F_{11})_3N$, tri-undecafluoroamylamine. This fraction was an isomeric mixture and had the following properties:

| | |
|---|---|
| Boiling range (at 726 mm.) °C | 215–216.5 |
| Refractive index (at 26° C.) | 1.301 |
| Density (grams/cc. at 25° C.) | 1.923 |
| Molecular weight (found) | 815 |
| Molecular weight (calc.) | 821 |

Example 6

150 grams of tri-n-hexylamine was dissolved in 2000 grams of commercial anhydrous liquid hydrogen fluoride and electrolyzed in the manner previously described. At the end of 58 hours, 250 grams of cell drainings were removed, washed, and distilled to yield a liquid main fraction which was identified as relatively pure normal $(C_6F_{13})_3N$, tri-n-tridecafluorohexylamine, which had the following properties:

| | |
|---|---|
| Boiling point (at 760 mm.) °C | 258 |
| Refractive index (at 20° C.) | 1.305 |
| Density (grams/cc. at 27° C.) | 1.922 |

Example 7

Using di-n-propylethylamine as the starting compound in the electrochemical process there was obtained a liquid fraction which was identified as relatively pure normal $(C_3F_7)_2N(C_2F_5)$, di-n-heptafluoropropyl - pentafluoroethylamine, which was found to have the following properties:

| | |
|---|---|
| Boiling point (at 732 mm.) °C | 111 |
| Refractive index (at 24° C.) | 1.273 |
| Density (grams/cc. at 24° C.) | 1.794 |
| Molecular weight (found) | 468 |
| Molecular weight (calc.) | 471 |

Example 8

102 grams of diisopropylethylamine, $$(i-C_3H_7)_2NC_2H_5$$

was dissolved in 1800 grams of commercial anhydrous liquid hydrogen fluoride and electrolyzed in the manner previously indicated. After 34 hours of operation, 18.7 grams of a liquid product was removed from the bottom of the cell and washed and distilled to yield a liquid fraction which was identified as relatively pure $(i-C_3F_7)_2NC_2F_5$, di-heptafluoroisopropyl-pentafluoroethylamine, resulting from complete fluorination of the starting compound. This fraction had the following properties:

| | |
|---|---|
| Boiling point (at 736 mm.) °C | 108 |
| Refractive index (at 28° C.) | 1.279 |
| Molecular weight (found) | 466 |
| Molecular weight (calc.) | 471 |

Example 9

Using diethyl-n-propylamine as the starting compound in the electrochemical process there was obtained a liquid fraction which was identified as relatively pure normal $(C_2F_5)_2N(C_3F_7)$, di-pentafluoroethyl - n-heptafluoropropylamine, which was found to have the following properties:

| | |
|---|---|
| Boiling point (at 760 mm.) °C | 93 |
| Refractive index (at 25° C.) | 1.270 |
| Density (grams/cc. at 27° C.) | 1.764 |
| Viscosity (centipoises at 20° C.) | 106 |

Example 10

Using diethyl-n-butylamine as the starting compound in the electrochemical process there was obtained a liquid fraction which was identified as relatively pure normal $(C_2F_5)_2N(C_4F_9)$, di - pentafluoroethyl - n - nonafluorobutylamine, which was found to have the following properties:

| | |
|---|---|
| Boiling point (at 743 mm.) °C | 113 |
| Refractive index (at 26° C.) | 1.275 |
| Density (grams/cc. at 27° C.) | 1.792 |
| Molecular weight (found) | 469 |
| Molecular weight (calc.) | 471 |

Example 11

A laboratory cell was charged with 809 grams of anhydrous liquid hydrogen fluoride and 48 grams of dimethylaniline, $(CH_3)_2NC_6H_5$. The latter was a redistilled sample, B. P. 190–195° C., $n_D^{20}$ 1.558. The applied D. C. potential was maintained in the range of 5.0 to 6.0 volts throughout the run, during which additional dimethylaniline was added to make a total of 71.7 grams. The duration of electrolysis was 186 hours, during which time 17.8 faradays of current had passed. The total cell residue, apart from hydrogen fluoride, weighed 135 grams, from which 73.7 grams of fluorocarbon-like liquid was obtained. This was washed with base and was fractionally distilled to yield a liquid fraction which was identified as relatively pure $$(CF_3)_2NC_6F_{11}$$

di-trifluoromethyl-undecafluorocyclohexylamine, having the following properties:

| | |
|---|---|
| Boiling point °C | 110–111 |
| Refractive index (at 20° C.) | 1.286 |
| Density (grams/cc. at 20° C.) | 1.835 |
| Molecular weight (found) | 428 |
| Molecular weight (calc.) | 433 |

This compound is the first member of the series having the general formula $RR'NC_6F_{11}$, where R and R' represent saturated aliphatic fluorocarbon groups, which may be the same or different, and $C_6F_{11}$ is a fluorocyclohexyl ring. Illustrative higher compounds are $(CF_3)(C_2F_5)NC_6F_{11}$, derivable from methylethylaniline; $(C_2F_5)_2NC_6F_{11}$, derivable from diethylaniline; $(C_3F_7)_2NC_6F_{11}$, derivable from dipropylaniline; and $$(C_4F_9)_2NC_6F_{11}$$

derivable from dibutylaniline. These compounds can also be derived from the corresponding saturated dialkylcyclohexylamine starting compounds as shown in the next example.

Example 12

Using diethylcyclohexylamine as the starting compound in the electrochemical process there was obtained a liquid fraction which was identified as relatively pure $(C_2F_5)_2N(C_6F_{11})$, di-pentafluoroethyl-undecafluorocyclohexylamine, which was found to have the following properties:

| | |
|---|---|
| Boiling range (at 738 mm.) °C | 145–149 |
| Refractive index (at 21.5° C.) | 1.300 |
| Density (grams/cc. at 30.5° C.) | 1.854 |
| Molecular weight (found) | 537 |
| Molecular weight (calc.) | 533 |

Example 13

185 grams of diethylbenzylamine, $$(C_2H_5)_2NCH_2C_6H_5$$

was dissolved in 2000 grams of commercial anhydrous liquid hydrogen fluoride and electrolyzed in the manner of the preceding examples. The electrolysis was continued for 93 hours with additions of the amine as needed to maintain concentration. The liquid product collected from the bottom of the cell was washed and fractionally distilled to yield a fraction which was identified as relatively pure $(C_2F_5)_2NCF_2C_6F_{11}$, di-pentafluoroethyl - tridecafluorocyclohexylmethylamine, a saturated trifluorocarbon amine compound having a fluorocyclohexyl ring, resulting from complete fluorine substitution of the hydrogens, and addition to the benzene ring, in the aromatic amine starting compound.

This fraction had the following properties:

| | |
|---|---|
| Boiling point (at 742 mm.) °C | 163–165 |
| Refractive index (at 26° C.) | 1.304 |
| Density (grams/cc. at 27° C.) | 1.892 |
| Molecular weight (found) | 568 |
| Molecular weight (calc.) | 583 |

Example 14

40 grams of N,N,N',N'-tetraethylethylenediamine, $(C_2H_5)_2N-CH_2CH_2-N(C_2H_5)_2$, was dissolved in 2000 grams of commercial anhydrous hydrogen fluoride and electrolyzed in the manner previously described. The run was continued for 69 hours, additional amine being added to maintain the organic concentration at about 2%, resulting in the producing of 264 grams of cell drainings, which were washed with aqueous potassium hydroxide and distilled to yield a liquid main fraction which was identified as relatively pure $(C_2F_5)_2N-CF_2CF_2-N(C_2F_5)_2$, N,N,N',N'-tetra - pentafluoroethyl - tetrafluoroethylenediamine, which was found to have the following properties:

| | |
|---|---|
| Boiling range (at 736 mm.) °C | 153–157 |
| Refractive index (at 27° C.) | 1.291 |
| Density (grams/cc. at 26° C.) | 1.858 |
| Molecular weight (found) | 612 |
| Molecular weight (calc.) | 604 |

Example 15

Using N,N,N',N'-n-tetrabutylethylenediamine as the starting compound in the electrochemical process there was obtained a liquid fraction which was identified as relatively pure normal $$(C_4F_9)_2N-CF_2CF_2-N(C_4F_9)_2$$

N,N,N',N'-tetra-n-nonafluorobutyl - tetrafluoroethylenediamine which was found to have the following properties:

| | |
|---|---|
| Boiling range (at 751 mm.) °C | 242–248 |
| Refractive index (at 25° C.) | 1.308 |
| Density (grams/cc. at 25° C.) | 1.902 |

Example 16

Using 2,4,6-tri(dimethylaminomethyl)phenol, having the structural formula:

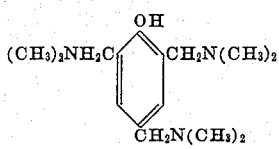

as the starting compound in the electrochemical process there was obtained a liquid fraction which was identified as relatively pure 1,3,5-[(CF₃)₂NCF₂]₃C₆F₉, wherein C₆F₉ is a saturated fluorocyclohexyl ring. This fully fluorinated triamine product compound resulted from saturation of the aromatic ring by fluorine addition and from replacement of the hydroxyl group and all of the hydrogens by fluorine atoms. This compound was found to have a boiling range (at about 740 mm.) of 221–245° C.

Example 17

40 grams of N-methylpiperidine was dissolved in 2000 grams of commercial anhydrous liquid hydrogen fluoride and electrolyzed in the manner of the preceding examples. During the 50 hour run additional amounts of the organic compound (totalling 110 grams) were added in order to maintain the concentration. The liquid cell drainings (216 grams) were washed with aqueous base and fractionally distilled to yield a 197 gram fraction of relatively pure C₅F₁₀NCF₃, N-trifluoromethyldecafluoropiperidine, having the following properties:

Boiling point (at 730 mm.) ° C.__ 65.0–65.5
Refractive index (at 24° C.) _____ 1.275
Density (grams/cc. at 24° C.) _____ 1.760
Molecular weight (found) _____ 336
Molecular weight (calc.) _____ 333

The identification of most of the foregoing fully fluorinated product compounds was further substantiated by the infra-red absorption spectra, which in each case establish the absence of unsaturation and the absence of hydrogen (either as carbon-hydrogen or as nitrogen-hydrogen).

The fluorinated N-alkylpiperidine compounds are claimed in our divisional application Ser. No. 290,316, filed on May 21, 1952.

Having described various embodiments of the invention, for purposes of illustration rather than limitation, what we claim is as follows:

1. As new and useful compositions of matter, saturated fluorocarbon tertiary amines of the class consisting of fully fluorinated alkyl and cyclohexyl tertiary amines wherein the molecules contain only carbon, fluorine and acyclic nitrogen atoms and each nitrogen atom is directly bonded to three carbon atoms of which at least two are constituents of —CF₂— groups, there being from one to three acyclic nitrogen atoms and from three to twenty-four carbon atoms per molecule.

2. Compounds according to claim 1 wherein each nitrogen atom is directly bonded to three —CF₂— groups.

3. Compounds according to claim 1 wherein the compounds are high-boiling fluorocarbon monoamines wherein the molecule contains a single nitrogen atom and at least eight carbon atoms.

4. Saturated aliphatic fluorocarbon tertiary amines, wherein the molecules contain only carbon, fluorine and nitrogen atoms and each nitrogen atom is directly bonded to three carbon atoms of which at least two are constituents of —CF₂— groups, there being from one to three nitrogen atoms and from three to twenty-four carbon atoms per molecule.

5. Saturated aliphatic fluorocarbon tertiary monoamines, wherein the molecules contain only carbon, fluorine and nitrogen atoms and the single nitrogen atom of each molecule is directly bonded to three carbon atoms.

6. Saturated aliphatic fluorocarbon tertiary diamines having the formula:

$$R'R''N-R-NR'''R''''$$

where the primed R's represent saturated aliphatic terminal fluorocarbon groups and R represents a nitrogen-linking saturated aliphatic fluorocarbon group.

7. Saturated fluorocarbon tertiary monoamines containing an N-bonded cyclohexyl ring, which have the formula:

$$RR'NC_6F_{11}$$

where R and R' represent saturated aliphatic fluorocarbon groups.

8. Saturated aliphatic trifluorocarbon monoamines having the formula:

$$R'R''R'''N$$

where the R's represent saturated aliphatic fluorocarbon groups.

9. High-boiling saturated aliphatic trifluorocarbon monoamines, wherein the molecules contain only one nitrogen atom and it is directly bonded to three saturated aliphatic fluorocarbon groups each of which contains from one to eight carbon atoms, the total number of carbon atoms per molecule being from eight to twenty-four.

10. The saturated trifluorocarbon amine compound having the formula (C₄F₉)₃N.

EDWARD A. KAUCK.
JOSEPH H. SIMONS.

No references cited.